(No Model.)  2 Sheets—Sheet 1.
A. C. BROWN.
ROTARY HARROW.
No. 398,937.  Patented Mar. 5, 1889.
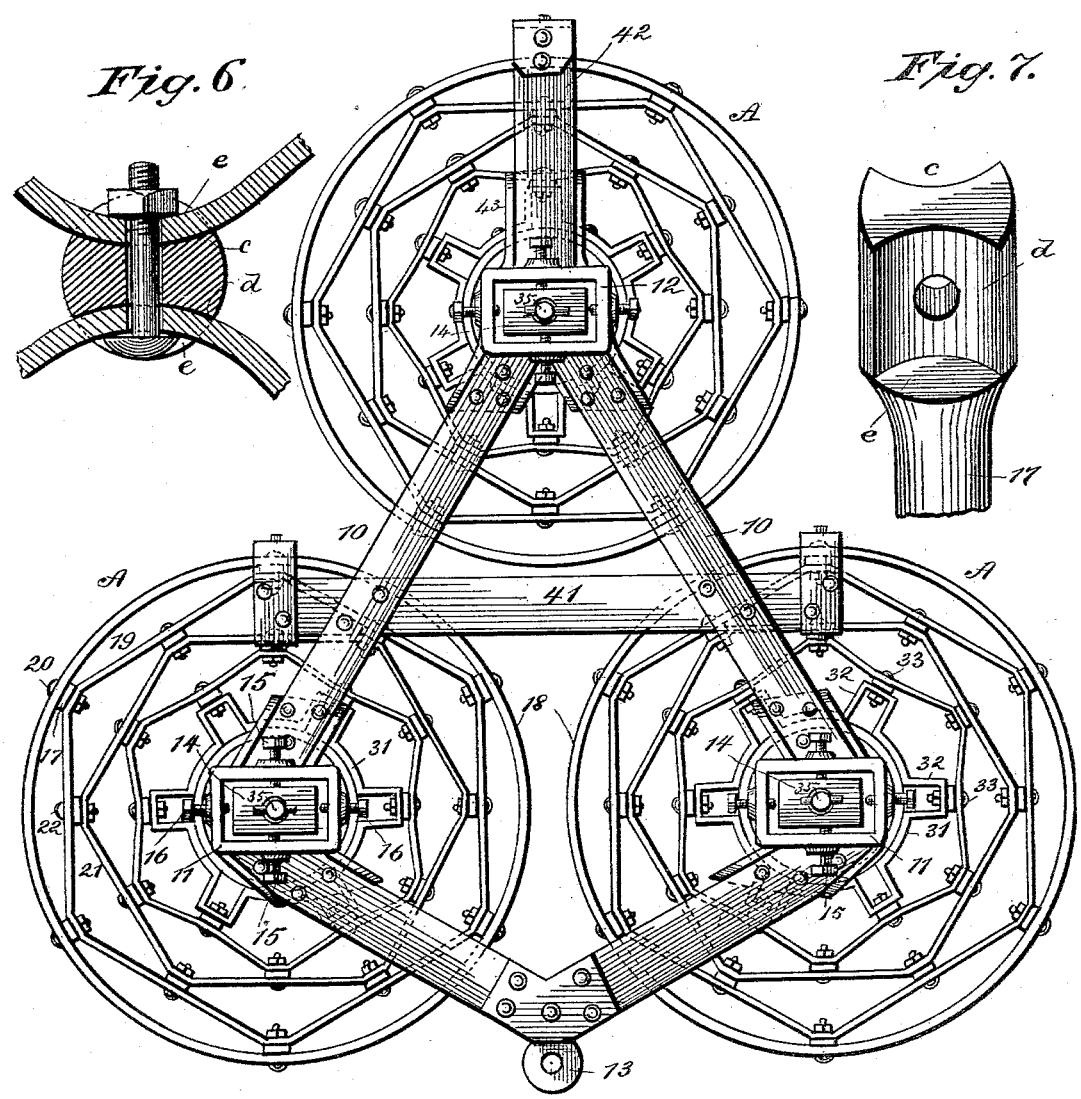
*Fig. 1.* *Fig. 6.* *Fig. 7.*
*Fig. 8.*
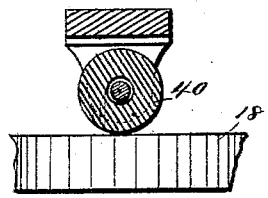
WITNESSES:
Phil. C. Dieterich
C. Sedgwick
INVENTOR:
A. C. Brown
BY Munn & Co.
ATTORNEYS.

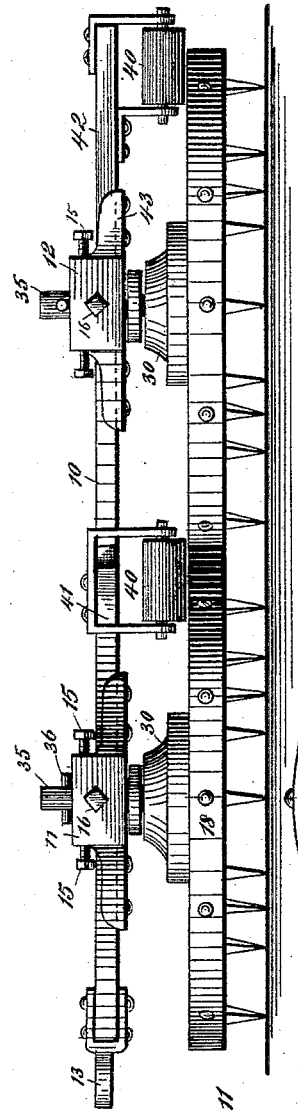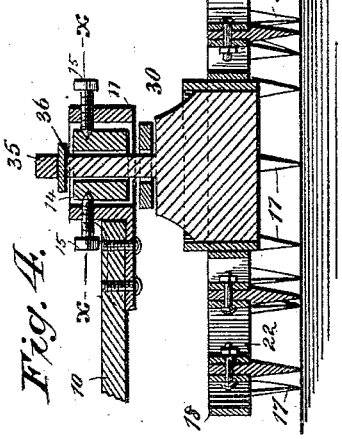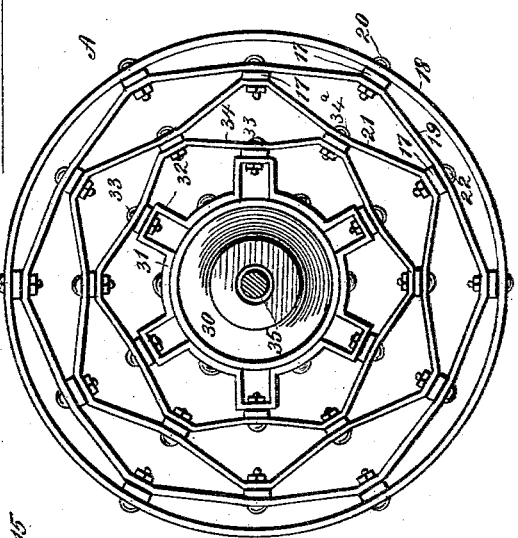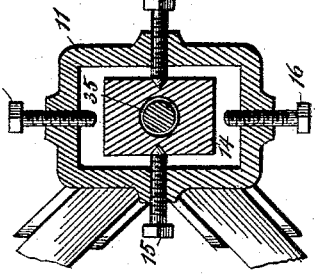

UNITED STATES PATENT OFFICE.

ASA C. BROWN, OF EUGENE CITY, OREGON.

ROTARY HARROW.

SPECIFICATION forming part of Letters Patent No. 398,937, dated March 5, 1889.

Application filed October 26, 1888. Serial No. 289,193. (No model.)

*To all whom it may concern:*

Be it known that I, ASA C. BROWN, of Eugene City, in the county of Lane and State of Oregon, have invented a new and Improved Rotary Harrow, of which the following is a full, clear, and exact description.

The object of this invention is to provide a cheap and durable rotary harrow, and one wherein the parts shall be so constructed and held that each set of harrow-teeth will be free to conform to any irregularity there may be in the ground over which the harrow is being drawn; and to the ends named the invention consists, essentially, of a trussed wheel provided with harrow-teeth and mounted to turn freely upon a gudgeon that is held within a block, said block being mounted to tilt within a box forming part of the main frame of the harrow, all as will be hereinafter more fully described, and specifically pointed out in the claims.

Reference is to be had to the accompanying drawings, forming part of this specification, in which similar figures and letters of reference indicate corresponding parts in all the views.

Figure 1 is a plan view of a harrow constructed in accordance with the terms of my invention. Fig. 2 is a side view of the same. Fig. 3 is a plan view of one of the harrow truss-wheels, the gudgeon being shown in section. Fig. 4 is a central sectional view of one of the truss-wheels, a portion of the harrow-frame being shown in connection therewith and in section. Fig. 5 is a sectional plan view illustrating the mounting of the harrow truss-wheels, the view being taken on line $x\,x$ of Fig. 4. Fig. 6 is an enlarged sectional view of a portion of the wheel and of one of the harrow-teeth, the view illustrating a modified form of tooth. Fig. 7 is a perspective view of the head of a tooth similar to the one shown in Fig. 6; and Fig. 8 is a view of a portion of the rim of one of the truss-wheels, the anti-friction wheel carried by the harrow-frame, against which the truss-wheel at times bears, being shown in section.

In constructing a harrow, such as the one illustrated in the drawings above referred to, I provide a frame, 10, of any suitable form adapted to support boxes 11 and 12, the box 12 being to the rear of the boxes 11. To the forward end of the frame 10 there is secured a draft-eye, 13.

Within the boxes 11 and 12 there are mounted blocks 14, which are held to place by set-screws 15, said set-screws entering recesses in the side faces of the blocks, but being so adjusted that the blocks will be free to tilt upon the screws, the range of motion of the blocks being limited by other set-screws, 16. This construction is best shown in Fig. 5.

The harrow-teeth 17 are supported by truss-wheels A, said wheels being made up of an outer rim, 18, to which there is bolted a strip, 19, the bolts 20, which hold the strip 19 to the rim 18, passing through apertures that are formed in the heads of the teeth, and to the strip 19 there is bolted a strip, 21, the bolts 22, which serve to connect the strip 21 to the strip 19, passing through the heads of an inner set of harrow-teeth and through the strip 19 at points midway between the bolts 20.

To the hub 30 there is bolted a strip, 31, formed with outwardly-extending loops, and to these loops there is connected a strip, 34, a set of harrow-teeth being interposed and supported by the connecting-bolts 33. The strip 34 may be connected to the strip 21, as at 34$^a$, harrow-teeth being arranged as in the other connections, or other strips and sets of harrow-teeth may be employed, as will be readily understood.

From the hub 30 there is an upwardly-extending gudgeon, 35, which passes through a central aperture formed in the supporting-block 14, the gudgeon being apertured to receive a key, 36, which prevents all accidental displacement of the parts.

Just above the rear of each of the wheels A there is mounted an anti-friction wheel or roll, 40, the rolls 40, arranged in connection with the two forward wheels A, being carried by a cross-bar, 41, that is bolted to the frame 10, while the anti-friction roll arranged in connection with the rear wheel is carried by a rearwardly-extending bar, 42, supported by a socket, 43, that extends to the rear from the box 12.

With such a harrow as the one above described each wheel is free to revolve independently of all of the other wheels and each wheel is free to tilt, so that the harrow-teeth will conform with any irregularities in the ground at right angles to the line of draft. Then, too, owing to the arrangement of the friction-wheels 40, the gudgeons 35 will be relieved of any undue strain.

In practice I prefer to employ harrow-teeth of the form shown in Figs. 6 and 7—that is, with concave bearing-faces $c$ $d$, below which concave bearing-faces there are shoulders $e$, upon which the strips employed in the construction of the wheels A rest.

Having thus described my invention, I claim as new and desire to secure by Letters Patent—

1. In a rotary harrow, the combination, with a supporting-frame, of tilting blocks carried by the frame, and wheels carrying harrow-teeth and formed with gudgeons adapted to enter apertures in the tilting blocks, substantially as described.

2. The combination, with a main supporting-frame carrying anti-friction rollers, of trussed harrow-teeth carrying wheels A, gudgeons extending from the wheels A, blocks through which the gudgeons pass, and a pivotal connection between the blocks and the main supporting-frame, substantially as described.

3. In a rotary harrow, the combination, with a box, 11, of a block formed with a central aperture, set-screws by which said block is supported within the box, limit-screws arranged in connection with the block, and a tooth-carrying wheel formed with a gudgeon which enters the aperture in the block, substantially as described.

4. A harrow-tooth formed with a head having concave faces, as $c$ and $d$, and shoulders, as $e$, substantially as described.

ASA C. BROWN.

Witnesses:
A. G. HOVEY,
H. C. HUMPHREY.